(12) United States Patent
Li et al.

(10) Patent No.: US 12,687,209 B2
(45) Date of Patent: Jul. 21, 2026

(54) SELF-RETAINING SPRING FOR FLAT-WIPING CONTACTS

(71) Applicant: IDEAL Industries, Inc., Sycamore, IL (US)

(72) Inventors: Jia Yong Li, Westford, MA (US); Joshua William Haney, Fitchburg, MA (US)

(73) Assignee: IDEAL Industries, Inc., Sycamore, IL (US)

( * ) Notice: Subject to any disclaimer, the term of this patent is extended or adjusted under 35 U.S.C. 154(b) by 484 days.

(21) Appl. No.: 18/001,331

(22) PCT Filed: Aug. 20, 2021

(86) PCT No.: PCT/US2021/046956

§ 371 (c)(1),
(2) Date: Dec. 9, 2022

(87) PCT Pub. No.: WO2022/040559

PCT Pub. Date: Feb. 24, 2022

(65) Prior Publication Data

US 2023/0243396 A1      Aug. 3, 2023

Related U.S. Application Data

(60) Provisional application No. 63/068,848, filed on Aug. 21, 2020.

(51) Int. Cl.
*F16F 1/02*       (2006.01)
*F16F 1/18*       (2006.01)

(52) U.S. Cl.
CPC ................ *F16F 1/027* (2013.01); *F16F 1/18* (2013.01)

(58) Field of Classification Search
CPC ......... H01R 13/18; H01R 13/187; F16F 1/18; F16F 1/027
See application file for complete search history.

(56) References Cited

U.S. PATENT DOCUMENTS 3,091,746 A      5/1963  Winkler
3,654,586 A      4/1972  Winkler
(Continued)

FOREIGN PATENT DOCUMENTS

CN        110666698 A      1/2020
CN        108933349 A      6/2022
(Continued)

OTHER PUBLICATIONS

Final Office Action from U.S. Appl. No. 29/879,151, dated Apr. 16, 2024, 8 pp.
(Continued)

*Primary Examiner* — Vishal R Sahni
(74) *Attorney, Agent, or Firm* — Greenberg Traurig, LLP

(57) ABSTRACT

A leaf spring for a flat-wiping connector includes a front section having a first surface corresponding to a plane, the front section further including a front edge configured to connect the leaf spring to the flat-wiping connector. The leaf spring further includes a rear section having a second surface angled with respect to the plane corresponding to the first surface of the front section. The rear section further includes a third surface connected to the second surface and oriented at an angle with respect to the second surface. At least a portion of an edge of the rear section is configured to interact with a positive stop of a connector housing to lock the leaf spring within the connector housing upon insertion of the leaf spring into the connector housing.

6 Claims, 12 Drawing Sheets

(56) References Cited

U.S. PATENT DOCUMENTS

| | | | | |
|---|---|---|---|---|
| 3,794,957 | A | | 2/1974 | Winkler |
| 4,147,400 | A | * | 4/1979 | Snyder, Jr. ............ H01R 13/426 |
| | | | | 439/744 |
| 4,335,931 | A | * | 6/1982 | Kinnear ................. H01R 13/28 |
| | | | | 439/744 |
| 4,990,099 | A | | 2/1991 | Marin |
| 5,106,320 | A | | 4/1992 | Kinnear |
| D352,797 | S | | 11/1994 | Mehaffey |
| 6,331,124 | B1 | | 12/2001 | Miyazaki |
| 6,573,450 | B2 | | 6/2003 | Saito |
| 7,153,152 | B1 | * | 12/2006 | Eby ......................... H01R 13/15 |
| | | | | 439/295 |
| 7,625,252 | B2 | | 12/2009 | Flynn |
| D612,807 | S | | 3/2010 | Mancini |
| D615,039 | S | | 5/2010 | Mancini |
| D642,528 | S | | 8/2011 | Gravolin |
| D650,743 | S | | 12/2011 | Smith |
| D650,744 | S | | 12/2011 | Smith |
| D650,745 | S | | 12/2011 | Smith |
| D650,746 | S | | 12/2011 | Smith |
| D650,749 | S | | 12/2011 | Smith |
| D650,750 | S | | 12/2011 | Smith |
| D650,752 | S | | 12/2011 | Smith |
| D659,640 | S | | 5/2012 | Tseng |
| D753,600 | S | | 4/2016 | Svelnis |
| D753,601 | S | | 4/2016 | Svelnis |
| D754,075 | S | | 4/2016 | Svelnis |
| D754,076 | S | | 4/2016 | Svelnis |
| D860,136 | S | | 9/2019 | Li |
| 10,418,727 | B1 | | 9/2019 | Wu |
| 10,573,988 | B2 | | 2/2020 | Mellott |
| D913,236 | S | | 3/2021 | Li |
| D913,939 | S | | 3/2021 | Li |
| D984,382 | S | | 4/2023 | Li |
| D991,178 | S | | 7/2023 | Haney |
| D991,179 | S | | 7/2023 | Haney |
| 2004/0171309 | A1 | | 9/2004 | Baker |
| 2008/0261460 | A1 | * | 10/2008 | Hariharesan ........... H01R 13/26 |
| | | | | 439/729 |
| 2009/0042442 | A1 | | 2/2009 | Sakamoto |
| 2009/0093149 | A1 | * | 4/2009 | Mancini ................. H01R 13/26 |
| | | | | 439/259 |
| 2009/0215312 | A1 | | 8/2009 | Deubel |
| 2011/0207354 | A1 | | 8/2011 | Tashiro |
| 2022/0109271 | A1 | | 4/2022 | Moser |

FOREIGN PATENT DOCUMENTS

| | | | |
|---|---|---|---|
| DE | 202018106899 | U1 | 3/2020 |
| JP | H05252641 | A | 9/1993 |
| JP | 3069752 | U | 6/2000 |
| JP | 2007026707 | A | 2/2007 |
| JP | 2020095891 | A | 6/2020 |
| JP | 07226256 | A | 5/2021 |
| JP | 2021140984 | A | 9/2021 |
| WO | 2007131534 | A1 | 11/2007 |

OTHER PUBLICATIONS

Non-final Office Action from U.S. Appl. No. 29/879,145, dated Jul. 25, 2024, 7 pp.

Extended European Search Report from application No. 21859220. 0, dated Nov. 8, 2024, 14 pp.

Machine translation of 202018106899 U1 to Wago Verwaltungs GMBH.

Office Action from Canadian application No. 3,188,121, dated Apr. 30, 2024, 3 pp.

International Search Report and Written Opinion of application number PCT/US22/16591, dated Jun. 2, 2022, 8 pp.

Office Action from CN application No. 202180051601.3, dated Jan. 27, 2025, 14 pp.

Anderson, Date: Aug. 4, 2021, [online], [site visited Aug. 24, 2023]. Available from internet, URL: https://www.andersonpower.com/us/en/about-us/news-and-events/ip68-waterproof-connector-series-sbs-x-75a.html (Year: 2021).

Examination report issued on Indian design application No. 339287-001, dated Mar. 23, 2021, 2 pages.

Examination report issued on Indian design application No. 339288-001, dated Mar. 15, 2021, 2 pages.

Non-Final Office Action of U.S. Appl. No. 29/747,385, dated Feb. 28, 2022, 17 pages.

Non-final Office Action from U.S. Appl. No. 29/879,151, dated Oct. 5, 2023, 8 pp.

ISR/US, International Search Report issued on PCT application No. PCT/US21/046956, dated Nov. 23, 2021, 2 pages.

ISR/US, Written Opinion issued on PCT application No. PCT/US21/046956, dated Nov. 23, 2021, 5 pages.

Office Action from Japanese application number 2024-544931, dated Jun. 17, 2025, 18 pp.

Extended Search Report from European application No. 22924481. 9, dated Jan. 9, 2026, 7 pp.

* cited by examiner

200

218

202

204

216

218

212    206    208    210

226

228

210

220  222  224

FIG. 4
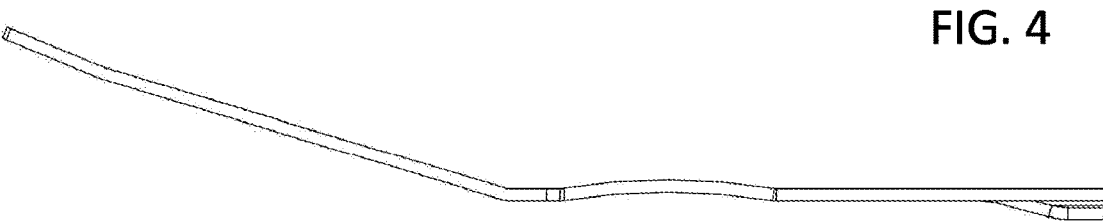
FIG. 5
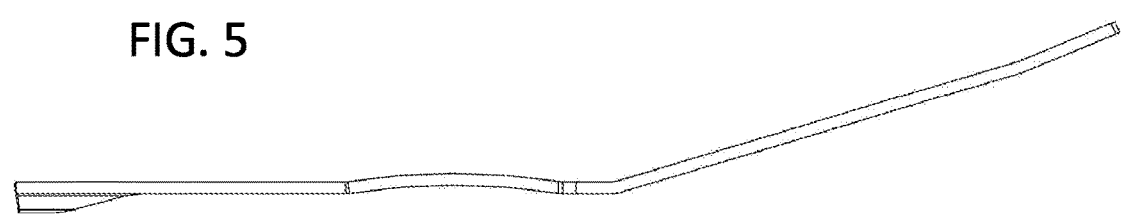
FIG. 6                    FIG. 7
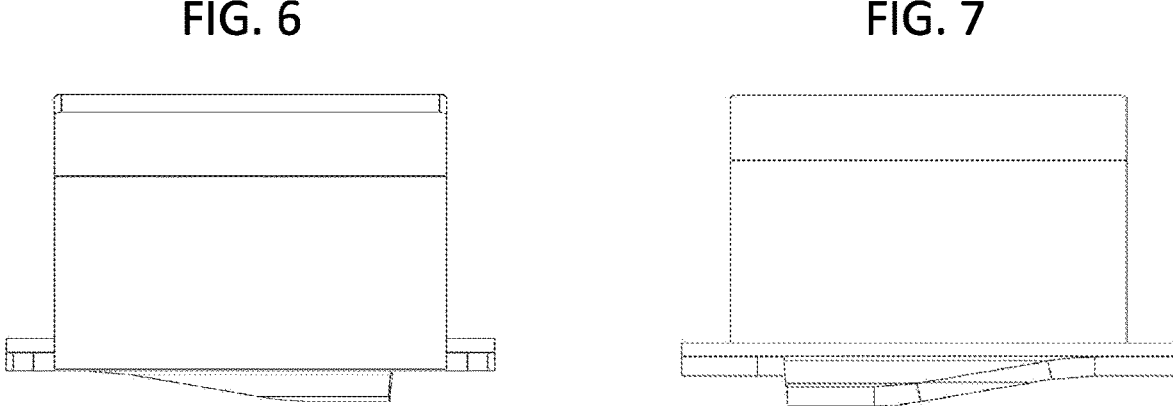

1000

30

216

SELF-RETAINING SPRING FOR FLAT-WIPING CONTACTS

CROSS-REFERENCE TO RELATED APPLICATION

This application claims the benefit of U.S. Provisional Patent Application No. 63/068,848, filed Aug. 21, 2020, the content of which is hereby incorporated by reference in its entirety.

FIELD OF THE DISCLOSURE

The present description relates generally to electrical connectors, methods for assembling electrical connectors, and more particularly to a self-retaining spring for flat-wiping type electrical contacts.

BACKGROUND OF RELATED ART

In general, electrical connectors, including flat-wiping contact connectors, are known in the art. For example, flat-wiping contact technology may be used in applications such as electrical power connections for materials handling trucks, and single pole and dual pole flat wiping contact connectors may be used for storage battery connections.

In one example, US Patent Application Publication No. 2009/0093149, incorporated herein by reference in its entirety, describes a flat-wiping contact and methods for producing them. For example, a plastic housing may be molded with a passageway or channel through the housing having a large backside opening intended for a conductor and a more defined front end opening for making the electrical connection to a mating connector. The passageway is configured with sidewall slots for locating and retaining a leaf spring that in turn retains the contact and provides the necessary wiping pressure for the contact when mated to another connector.

A method for assembling such connectors may include inserting the spring into the housing through the large backside opening where it is locked into position in its slots by cold forming (staking) a portion of the plastic housing up behind the back end of the spring after the spring is inserted. External of the housing, a flat wiping contact is mated to a suitable conductor. The contact is then installed in the housing through the large back end opening, being slid forward until it latches over the front end of the spring.

While the noted electrical connectors may be suitable for their intended purposes, there remains a strong desire for improved flat-wiping connectors that require easier assembly but still perform as a flat-wiping connector.

SUMMARY

An example embodiment of a leaf spring for a flat-wiping connector includes a front section having a first surface corresponding to a plane, the front section further including a front edge configured to connect the leaf spring to the flat-wiping connector. The leaf spring further includes a rear section having a second surface angled with respect to the plane corresponding to the first surface of the front section. The rear section further includes a third surface connected to the second surface and oriented at an angle with respect to the second surface. At least a portion of an edge of the rear section is configured to interact with a positive stop of a connector housing to lock the leaf spring within the connector housing upon insertion of the leaf spring into the connector housing.

An example system for receiving a flat-wiping connector includes a connector housing including a first opening configured to receive the flat-wiping connector. The system further includes a leaf spring secured within the connector housing and further configured to secure the flat-wiping connector within the connector housing. The connector housing further includes a positive stop feature abutting a jog feature of the leaf spring.

A method for assembling a flat-wiping connector includes forming a connector housing configured to receive a leaf spring via a first opening, the connector housing including an integrally formed positive stop. The method further includes inserting a leaf spring having a jog feature into the first opening of the connector housing into a locked position within the connector housing. The jog feature of the leaf spring abuts the positive stop of the connector housing to lock the leaf spring into the connector housing.

BRIEF DESCRIPTION OF THE DRAWINGS

FIG. 4 is a front elevational view of the leaf spring of FIG. 2 in accordance with the teachings of the present disclosure.

FIG. 5 is a rear elevational view of the leaf spring of FIG. 2 in accordance with the teachings of the present disclosure.

FIG. 6 is a left side elevational view of the leaf spring of FIG. 2 in accordance with the teachings of the present disclosure.

FIG. 7 is a right side elevational view of the leaf spring of FIG. 2 in accordance with the teachings of the present disclosure.

DETAILED DESCRIPTION

The following description of example methods and apparatus is not intended to limit the scope of the description to the precise form or forms detailed herein. Instead the following description is intended to be illustrative so that others may follow its teachings.

Described herein is a self-retaining spring for a flat-wiping contact electrical connector, that may be inserted into a flat-wiping contact housing. The self-retaining spring and the housing are advantageously shaped such that the spring will be retained within the housing upon insertion of the spring into the housing. Thus, the housing of the various embodiments described in the present disclosure need not be cold formed (staked) to retain the spring within the housing.

Figure 1A:
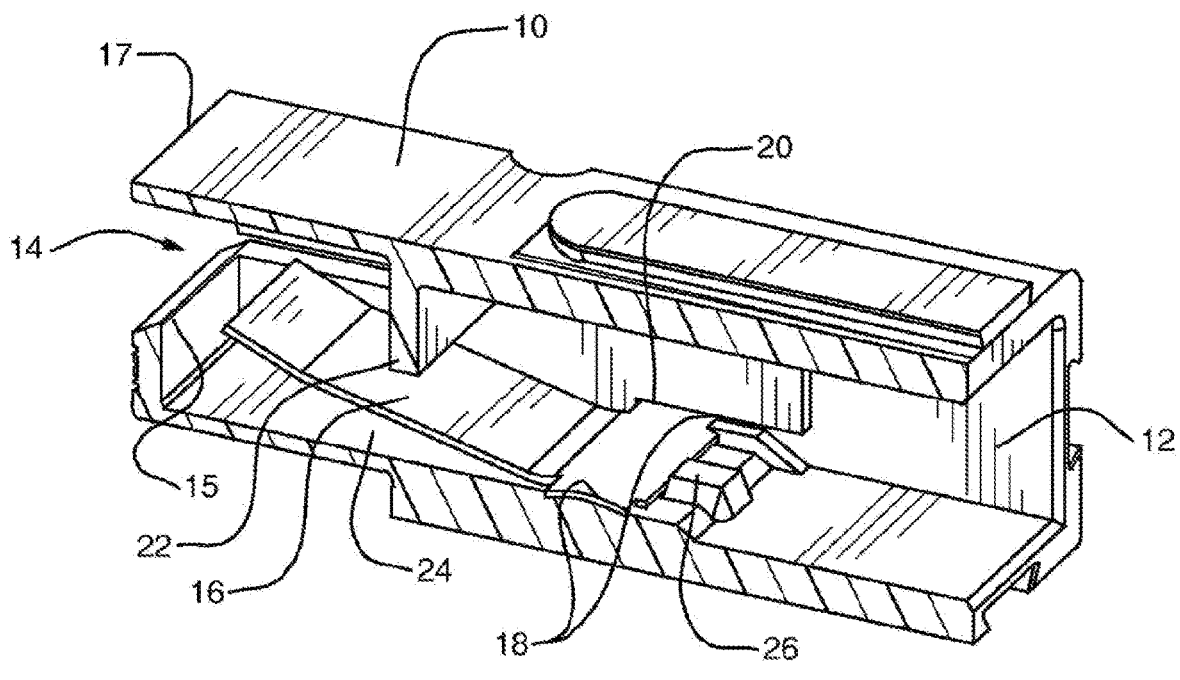
FIG. 1A is a cross-sectional perspective view of an example electrical connector housing for a flat-wiping contact with a cold formed stake.
Figure 1B:
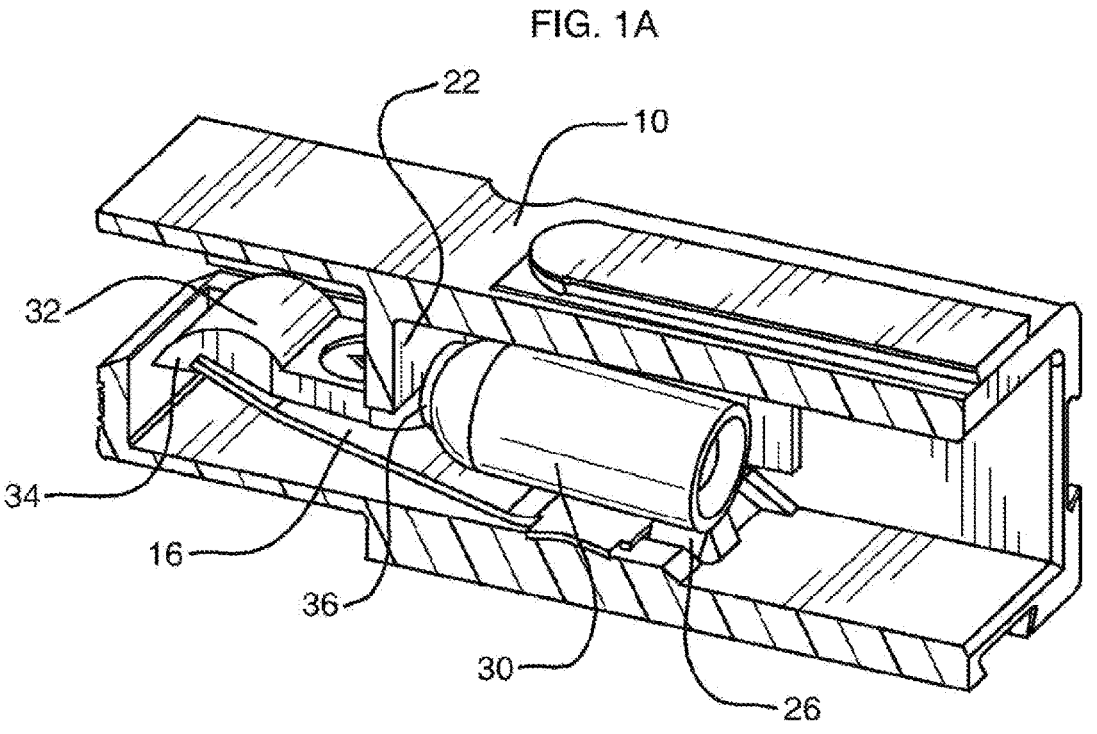
FIG. 1B is a cross-sectional perspective view of the example electrical connector housing of FIG. 1A with the flat-wiping contact installed.

Referring to FIGS. 1A and 1B, an example of a housing and a spring that is not self-retaining is shown. In particular, FIGS. 1A and 1B illustrate a perspective view of a single pole housing 10 for a flat wiping connector, sectioned to reveal the interior details.

Backend opening 12 and front end opening 14 define a passageway or channel through housing 10. The front end in this case is configured as a hermaphroditic or genderless connector, with complimentary chin 15 and U-shaped hood 17 structure able to be connected to another identical connector that is rotated 180 degrees, so that the contact surfaces engage properly. The opposing offset chins 15 align during connecting to enclose the engaged contacts 32 and the U-shaped hoods 17 on each of the mating connectors act to longitudinally and rotationally align and accept the opposing connector chin 15 in a straight-in connecting motion. The U-shaped hood restricts this type connector to only a straight-in connecting motion.

Referring again to FIG. 1A, leaf spring 16 is retained by spring base extensions 18 held in two opposing spring pockets or slots 20 (only one shown) proximate and parallel to floor 24. Spring slots 20 are clearly configured to be open to or accessible from the backend opening 12 for spring insertion. The leaf spring 16 is inserted through back end opening 12 so that extensions 18 slide into slots 20. The spring is retained in its final position in slots 20 by spring stake 26, driven upward by external pressure through floor 24, just aft of the base of the spring. The stake 26 is cold formed into the floor 24 of the housing 10 after the leaf spring 16 is inserted into the housing 10. The leaf spring 16 is therefore locked into position because the front edges of the extensions 18 are limited from moving past a front edge of the slots 20, and the rear edge of the leaf spring 16 is limited from moving by the stake 26. The leaf spring 16's cantilevered forward end extends past the barrier wall 22 and is biased upwards away from floor 24.

Referring to FIG. 1B for the description of assembly; contact 30 comprises a front end wiping surface 32, terminated by spring hook 34, and a back end conductor receiver 36. (The conductor is not shown.) Contact 30 is installed by being inserted into backend opening 12 so that the front end wiping surface 32 passed under barrier wall 22, riding along on upwardly biased leaf spring 16 until spring hook 34 latches or snaps over the forward edge or end of the leaf spring 16. The housing is dimensionally configured so that the forward end of conductor receiver 36 abuts barrier wall 22 at this point, whereby contact 30 is locked in its position, restrained from further forward or aft motion and limited to only vertical motion by compression of leaf spring 16.

Thereafter in operation, floating action provided by spring 16 enables contact 30 to be depressed sufficiently during mating with another opposing connector to accept the slight vertical displacement caused by the wiping motion that brings the two opposing contacts into a compressive engagement of their respective wiping surfaces 32 through which electrical current is passed.

However, the cost and time for fabricating the connector shown in FIGS. 1A and 1B may be reduced if the number of fabrication steps were reduced. In particular, after inserting the leaf spring 16, the connector must be staked by deforming material of the housing 10. The embodiments disclosed herein include an improved connector housing and improved leaf spring that may be inserted into the improved connector housing, such that the leaf spring is automatically retained in the connector housing without staking the connector housing. Thus, the fabrication step of staking the connector housing may be omitted using the connector and leaf springs described herein.

Other connectors use a two-part housing design, so that the two parts may fasten around the leaf spring to secure the leaf spring within a housing. However, such a process also uses additional steps that may be avoided by using the embodiments disclosed herein. Namely, a two-part housing design requires multiple housing sections to be molded, the spring connector must be placed in a first housing section, and then the second housing section is fastened to the first housing section. In addition, a two-part housing may be less durable than a unitary connector housing. Using the embodiments disclosed herein, only a single connector housing need to be molded, and there is no need to fasten two connector housing pieces together, thereby reducing the time, cost, and effort to assemble.

In addition, connector housings that may receive multiple leaf springs and connectors may advantageously be formed and assembled according to the methods described herein. In particular, because the connector housing need not be staked after the leaf spring is inserted, the housing connector may vary more in shape, size, number of connectors, etc. because it does not need to accommodate any staking to assemble the connector.

Figure 2:
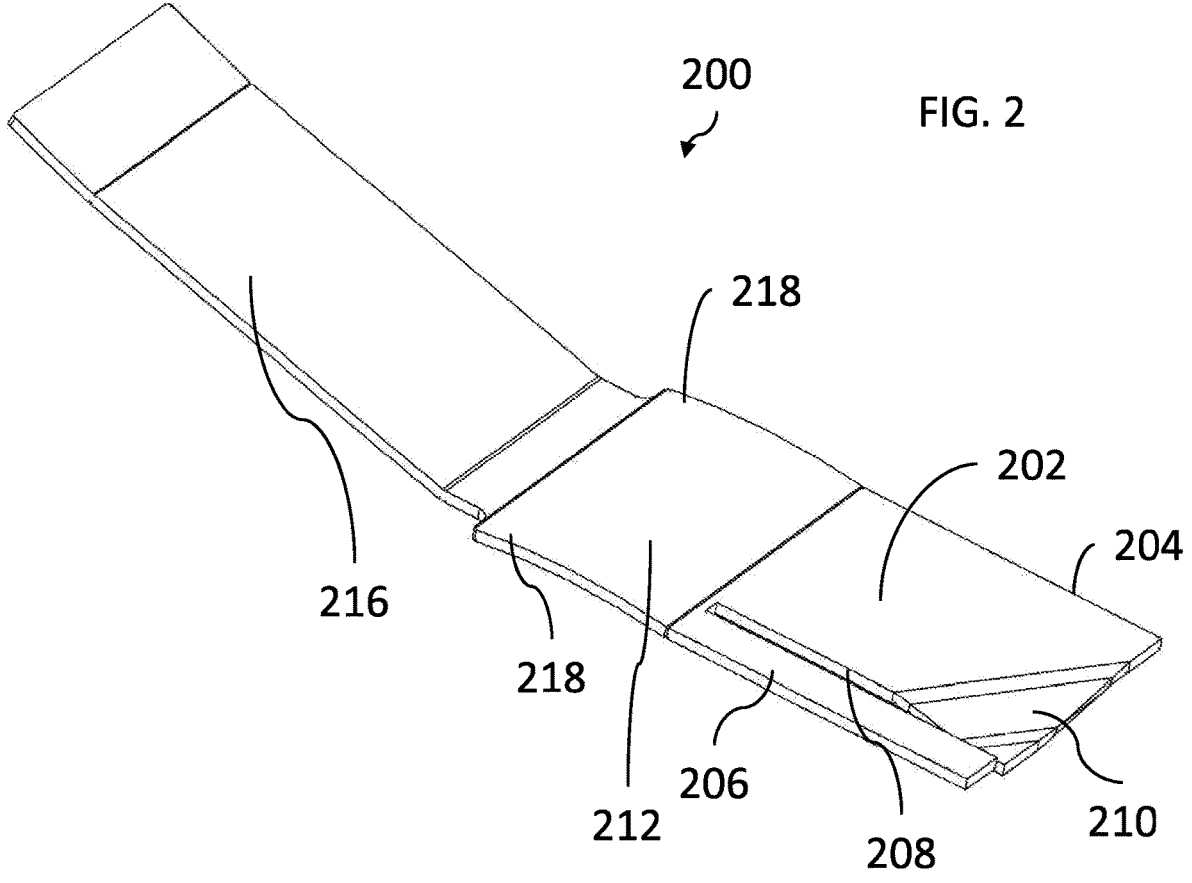
FIG. 2 is a top-right perspective view of an example leaf spring in accordance with the teachings of the present disclosure.

FIG. 2 is a perspective view of an example leaf spring 200 that may be used in various embodiments as disclosed herein. The leaf spring includes a front section 216 and a middle section 212, which together may be similar to the leaf spring 16 of FIGS. 1A and 1B. The middles section includes extensions 218 on either side that may slide into slots of a connector housing, similar to how the extensions 18 of the leaf spring 16 in FIGS. 1A and 1B slide into the slots 20 of the connector housing 10.

The leaf spring 200 additionally includes a rear section 202 that advantageously enables the leaf spring 200 to be inserted into a connector housing and automatically be retained therein, as further demonstrated in and discussed with respect to FIGS. 10-16. In particular, the various features of the rear section 202 of the leaf spring interact with a connector housing so that the leaf spring 200 is retained therein without having to stake the connector housing, have a two-part housing, etc.

The rear section 202 of the leaf spring 200 includes two edges 204 and 206 that are as wide as the extensions 218. The edges 204 and 206 may therefore be received by slots of a connector housing similar to the extensions 218 when the leaf spring 200 is inserted into a connector housing. The leaf spring 200 also includes an opening 208, so that a jog 210 may formed in the rear section 202, but the two edges 204 and 206 may be maintained in the rear section 202.

The jog 210 bends down away from the rest of the leaf spring 200. As shown in and described with respect to FIGS. 10-16, the jog 210 interacts with a positive stop formed in a connector housing while inserting the leaf spring 200 into a connector and, after full insertion, interferes with the positive stop to lock the leaf spring 200 in the connector.

Figure 3:
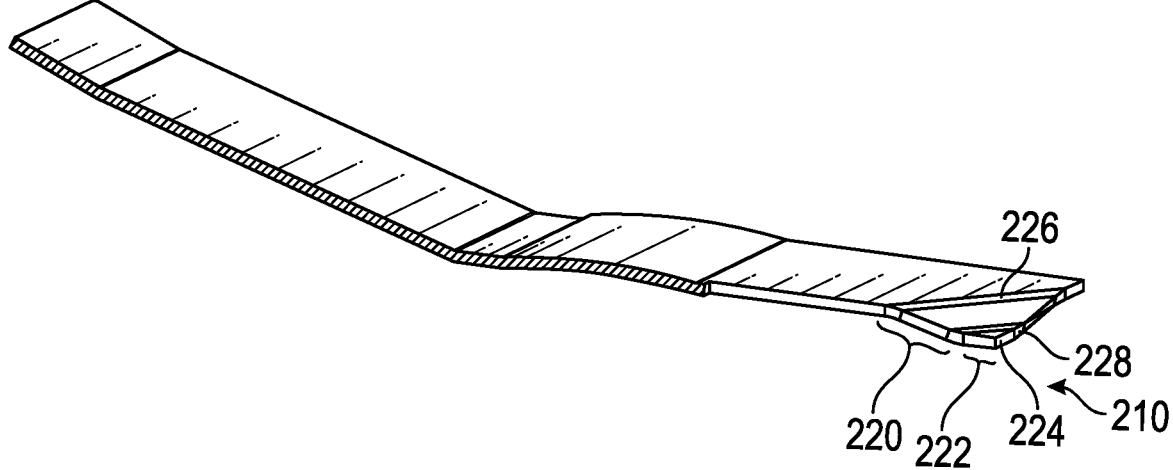
FIG. 3 is a cross-sectional top-right perspective view of the leaf spring of FIG. 2 taken along the cross-sectional line Z in FIG. 8 in accordance with the teachings of the present disclosure.
Figure 8:
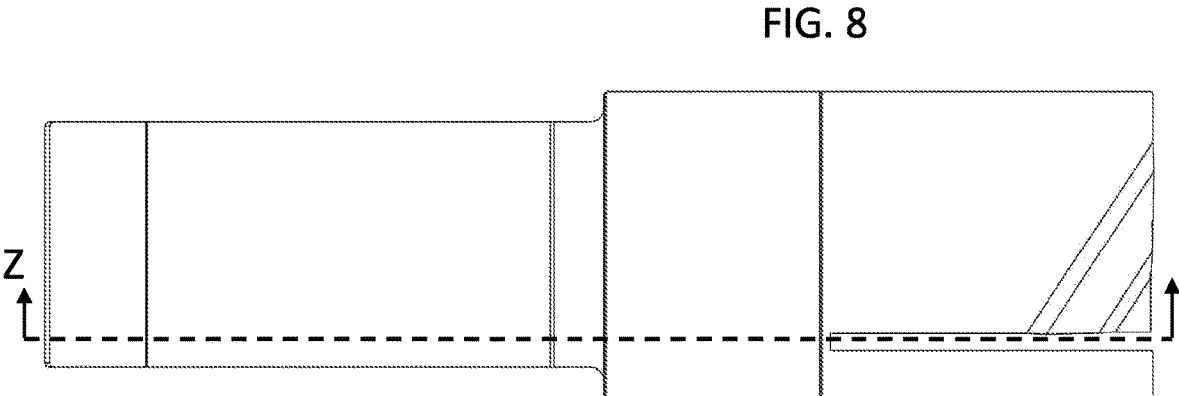
FIG. 8 is a top plan view of the leaf spring of FIG. 2 in accordance with the teachings of the present disclosure.

FIG. 3 is a cross-sectional top-right perspective view of the leaf spring 200 of FIG. 2 taken along the cross-sectional line Z in FIG. 8. In particular the cross-section is taken along a plane that passes through the opening 208 to better show the jog 210 of the leaf spring 200. The jog 210 includes an angled portion 220 and a flat portion 222. The flat portion 222 forms an edge 224, that may advantageously interfere with a positive stop of a connector housing to ensure that the leaf spring 200 is secured within the housing. The flat edge may advantageously increase the force necessary to forcibly separate the connector housing and the leaf spring 200 if a force acts along the leaf spring 200 in an opposite direction to a direction in which the leaf spring 200 was originally inserted into a housing.

The angled portion 220 and the flat portion 222 may be formed by bending a portion of the rear section 202 to form the jog 210. For example, the jog 210 may be formed by bends 226 and 228. The bends 226 and 228 may have the same or different bend radii, and also may have different radii in different embodiments. A method for forming the leaf spring 200 may include cutting the opening 208, bending the rear section 202 to form the bend 226, and subsequently bending the rear section 202 to form the bend 228, thereby forming the job 210.

Figure 9:
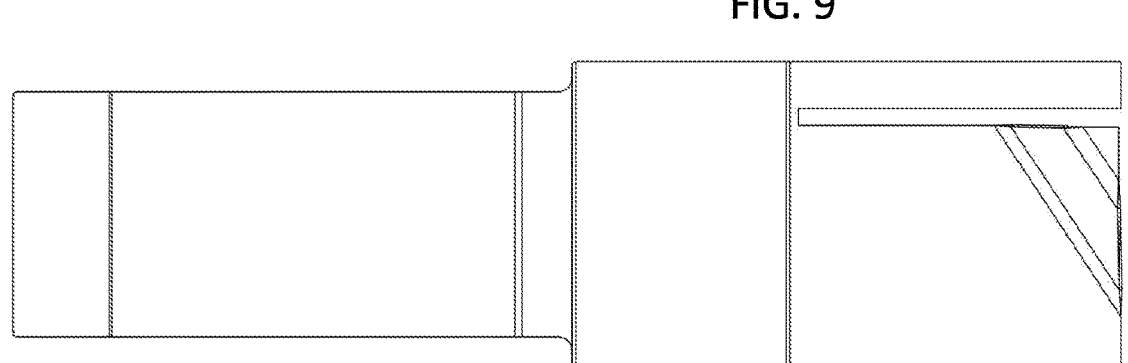
FIG. 9 is a bottom plan view of the leaf spring of FIG. 2 in accordance with the teachings of the present disclosure.

FIG. 4 is a front elevational view of the leaf spring 200 of FIG. 2. FIG. 5 is a rear elevational view thereof. FIG. 6 is a left side elevational view thereof. FIG. 7 is a right side elevational view thereof. FIG. 8 is a top plan view thereof. FIG. 9 is a bottom plan view thereof.

Figure 10:
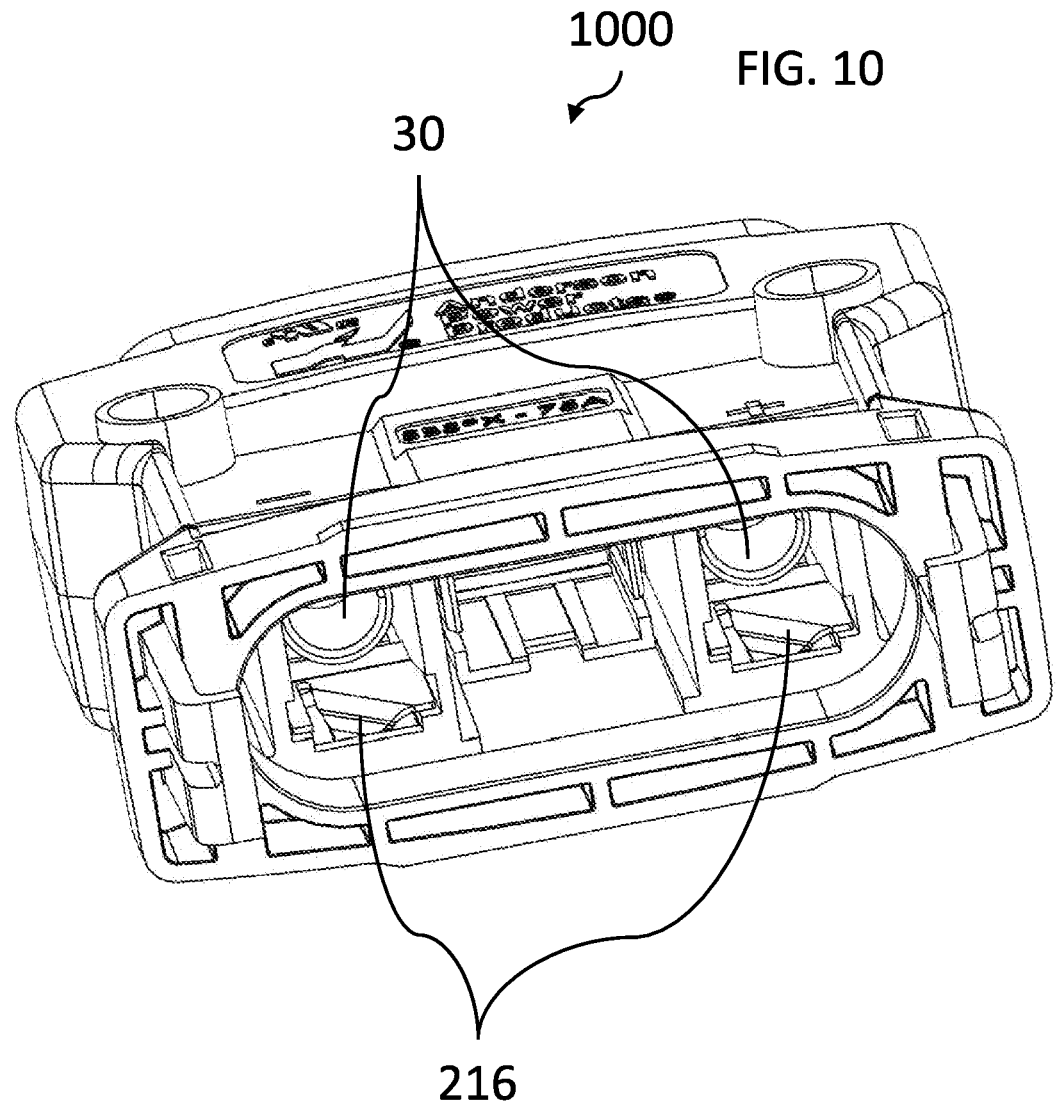
FIG. 10 is a perspective view of an example connector housing with two leaf springs and two electrical connectors inserted therein.
Figure 11:
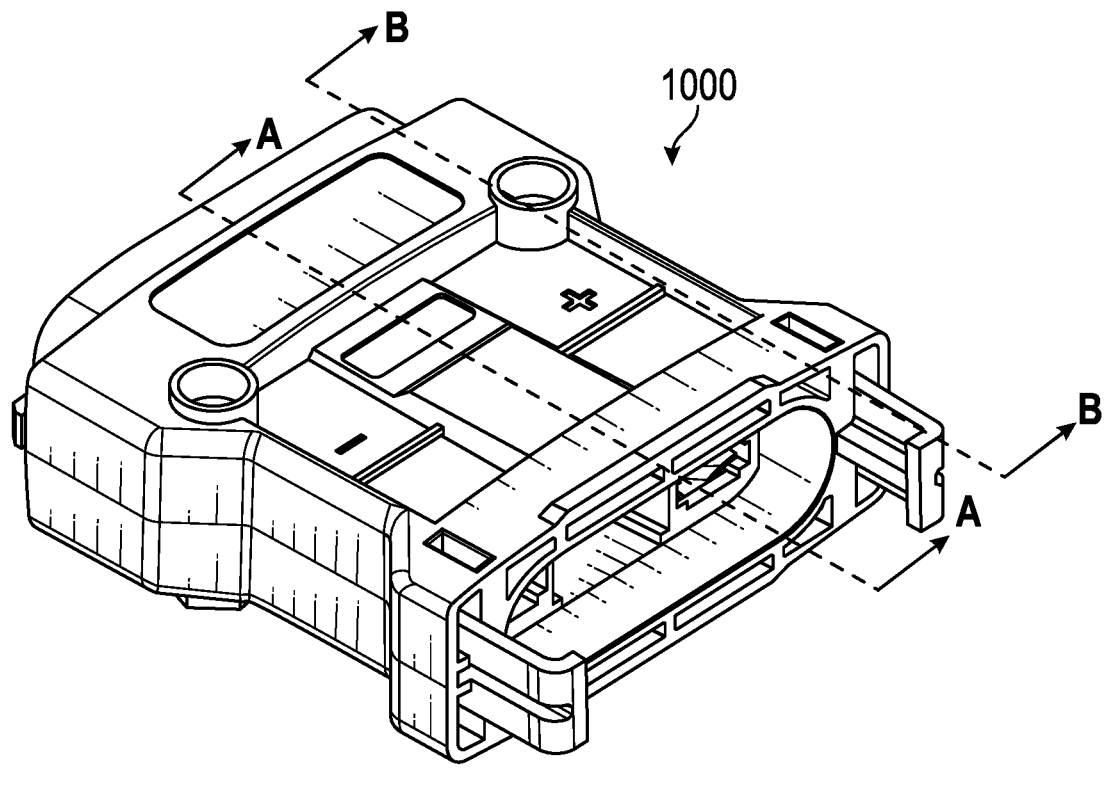
FIG. 11 is a perspective view of the example connector housing of FIG. 10 showing cross-sectional cut lines in accordance with the teachings of the present disclosure.
Figure 12:
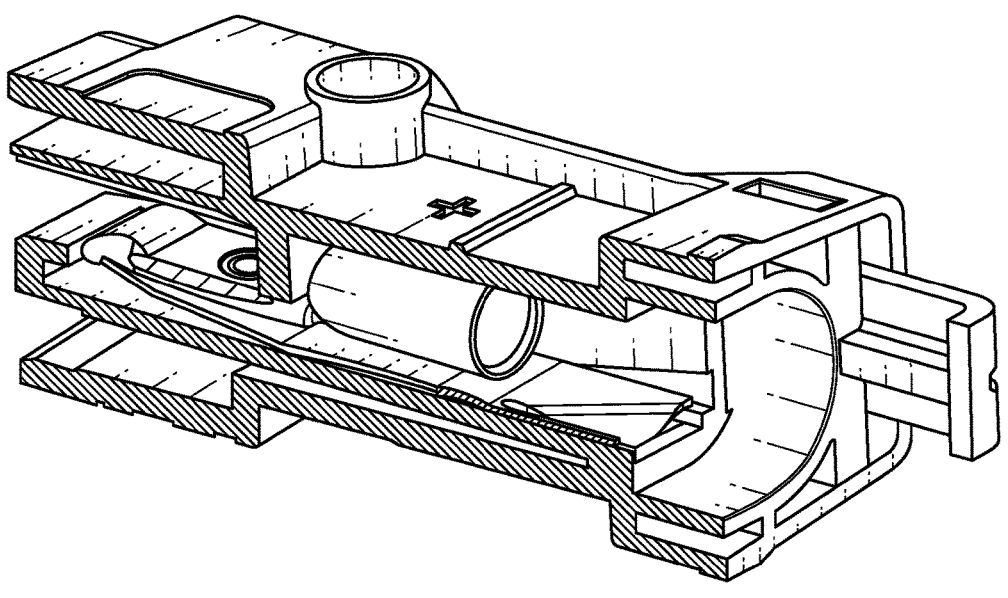
FIG. 12 is a cross-sectional perspective view of the example connector housing of FIG. 10 taken along the cross-sectional line A in FIG. 11 in accordance with the teachings of the present disclosure.
Figure 13:
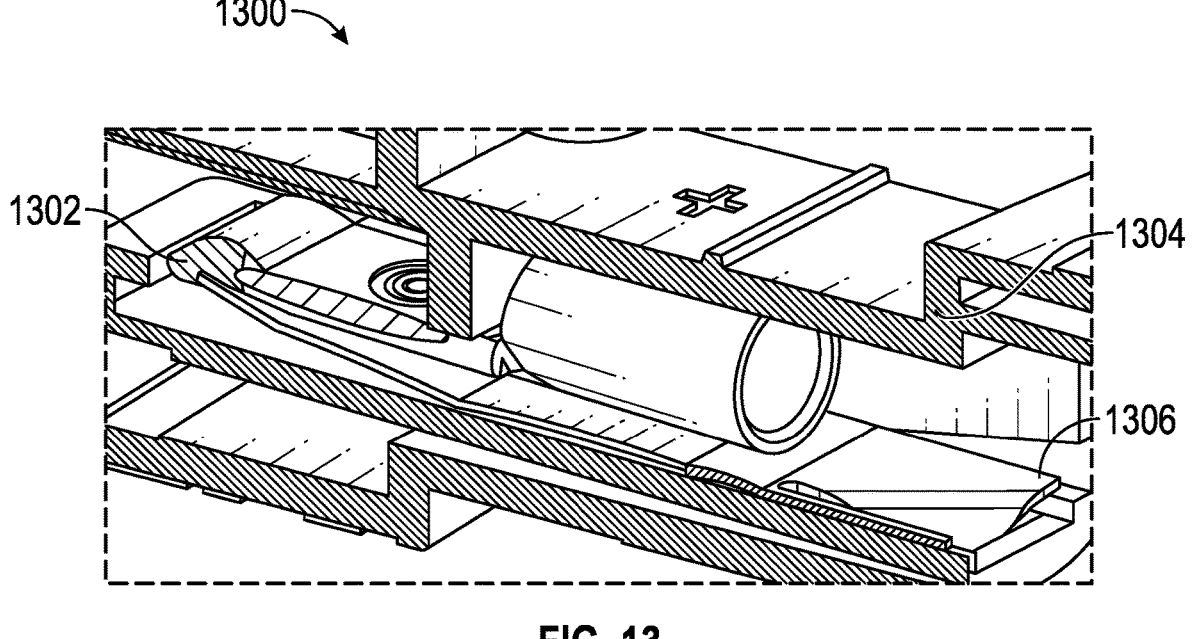
FIG. 13 is a close up view of the cross-sectional perspective view of FIG. 12 in accordance with the teachings of the present disclosure.
Figure 14:
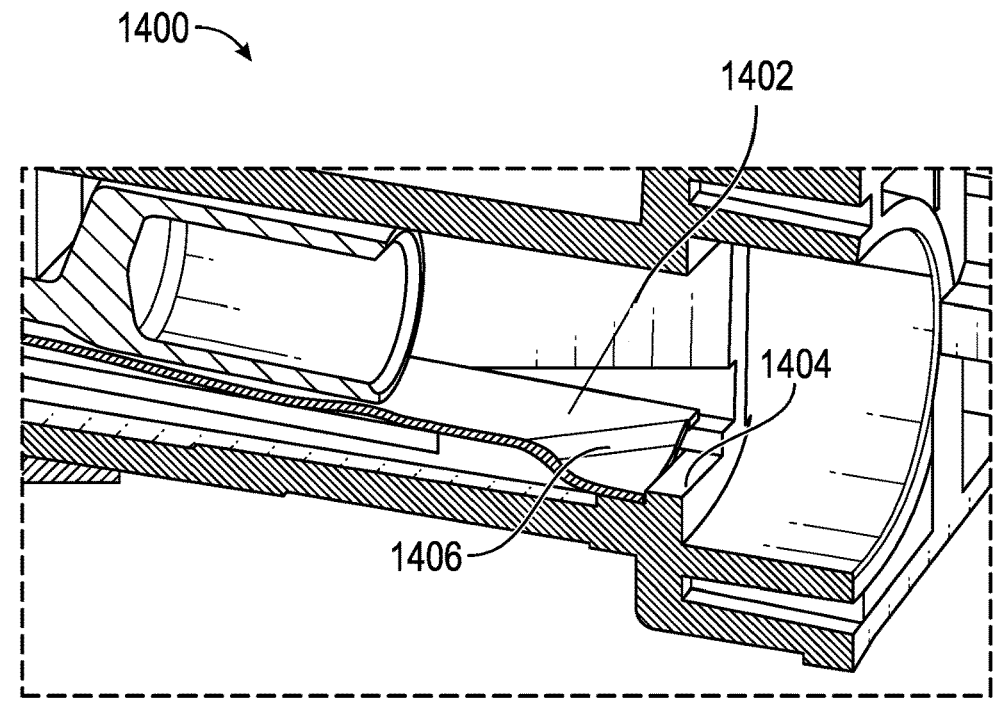
FIG. 14 is an alternate close up view of the cross-sectional perspective view of FIG. 12 in accordance with the teachings of the present disclosure.

FIG. 10 is a perspective view of an example connector housing 1000 with two leaf springs 216 and two electrical connectors 30 inserted therein. FIG. 11 is a perspective view of the example connector housing 1000 of FIG. 10 showing cross-sectional cut line A. FIG. 12 is a cross-sectional perspective view of the example connector housing 1000 of FIG. 10 taken along the cross-sectional line A in FIG. 11. FIG. 13 is a close up view 1300 of the cross-sectional perspective view of FIG. 12. FIG. 14 is an alternate close up view 1400 of the cross-sectional perspective view of FIG. 12 of the example connector housing 1000.

As demonstrated in FIGS. 13 and 14, a leaf spring, or self-retaining spring 1306, is in its fully installed position within the connector housing 1304. A jog feature 1406 of the leaf spring has moved past a positive stop 1404. A middle section of the leaf spring is slightly curved (as shown in FIGS. 2, 4, and 5), and the extensions therefore may create a resistance fit within the slots of the of the connector housing 1304. As the leaf spring 1306 is inserted into the connector housing 1304, those slots will bias the middle section, and therefore the entire leaf spring 1306, toward the bottom of the connector housing. Thus, once the end of the leaf spring 1306 slides past the positive stop 1404, the jog feature 1406 will be biased to move downward next to the positive stop 1404. Accordingly, once fully inserted, the jog feature 1406 interferes with the positive stop 1404 to secure the leaf spring 1306 within the connector housing 1304 and position a flat-wiping contact 1302 within the connector housing 1304 to be able to contact another flat-wiping contact within another connector housing. An entire rear section 1402 further supports the jog feature 1406 of the leaf spring 1306.

Figure 15:
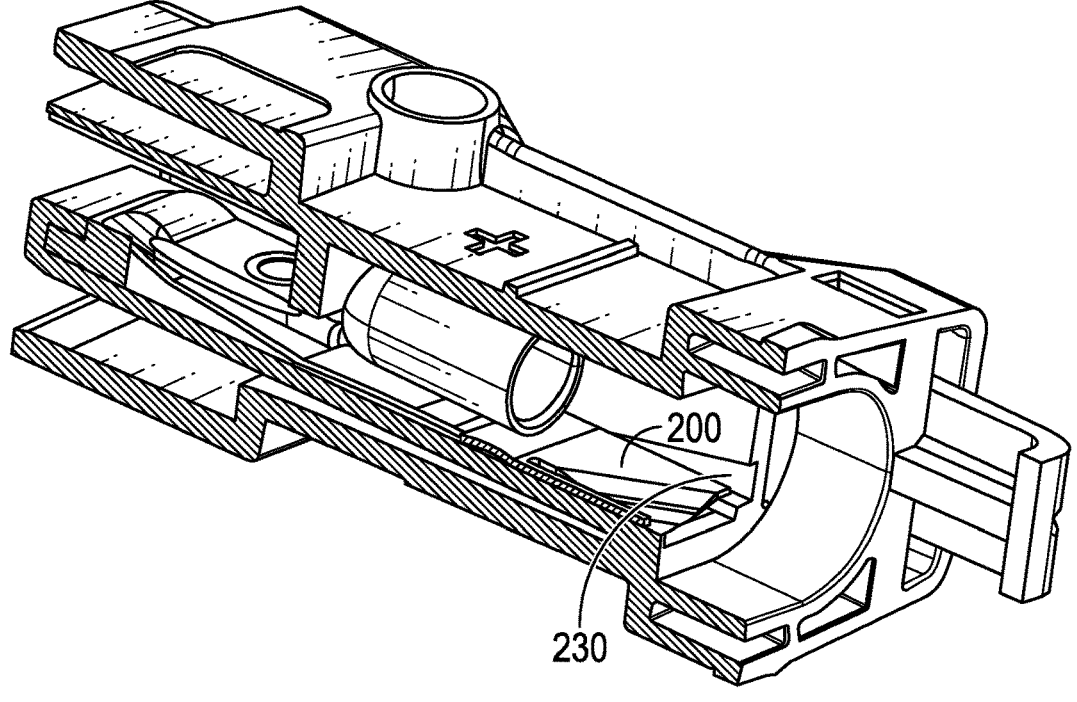
FIG. 15, shows another cross-sectional perspective view of the connector housing of FIG. 10 taken along the cross-sectional line A in FIG. 11 in accordance with the teachings of the present disclosure.
Figure 16:
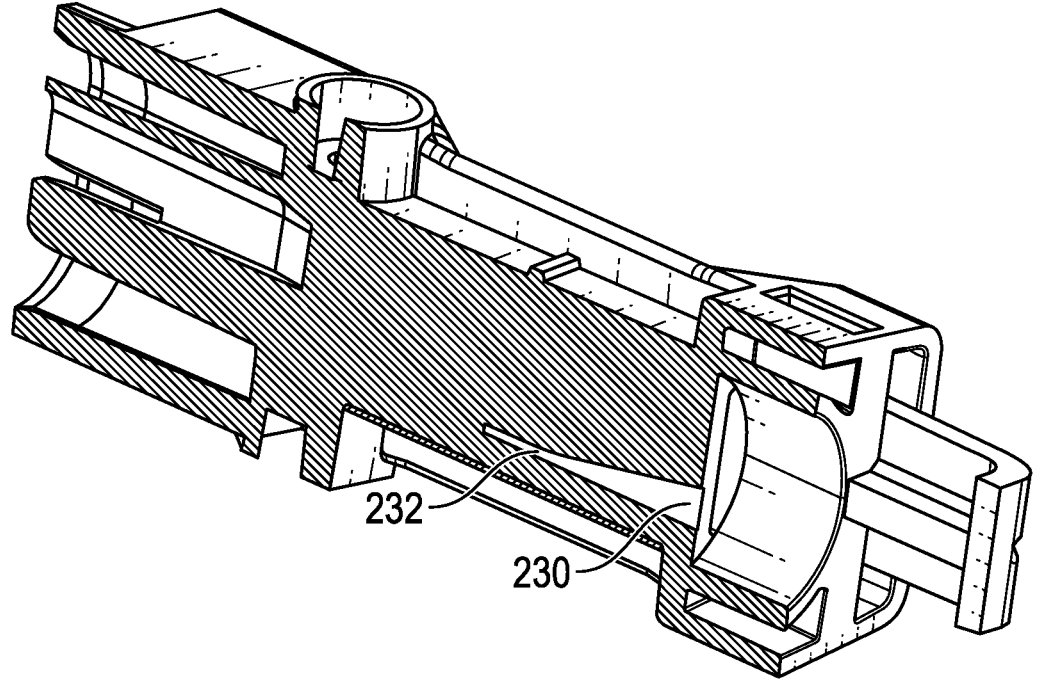
FIG. 16 is a cross-sectional perspective view of the connector housing of FIG. 10 taken along the cross-sectional line B in FIG. 11 in accordance with the teachings of the present disclosure.

FIG. 15, shows cross-sectional perspective view of the connector housing 1000 of FIG. 10 taken along the cross-sectional line A in FIG. 11. In particular, FIG. 15 demonstrates a slot 230 which may receive an edge (e.g., one of the extensions 218 and the edge 204 of the leaf spring 2 of FIG. 2). As is further demonstrated in FIG. 16, the slot 230 is shaped differently than the slot 20 of the connector housing 10 of FIGS. 1A and 1B. FIG. 16 is a cross-sectional perspective view of the connector housing 1000 of FIG. 10 taken along the cross-sectional line B in FIG. 11.

In particular, the slot 230 has a wider portion that narrows further into the connector housing 1000, until eventually the slot 230 is of a constant width at the portion 232. The constant width portion 232 may receive the middle portion 212 of the leaf spring 200 of FIG. 2 once the leaf spring 200 is fully inserted into the connector housing 1000. As disclosed herein, that constant width portion 232 may interact with the slightly curved middle portion 212 so that the jog feature of the leaf spring is biased toward a bottom of the connector housing. Accordingly, once the leaf spring is fully inserted, the leaf spring will be locked into place automatically within the connector housing, because the constant width portion 232 of the connector housing will interact with the middle portion 212 to keep the leaf spring from moving up, down, or forward, while the positive stop of the connector housing will interact with the jog feature of the leaf spring to keep the leaf spring from moving backward.

Additionally, the slot 230 starts out wider and gradually guides the middle portion 212 toward the constant width portion 232. This configuration allows the edges and extensions of the leaf spring to more easily enter the slot 230 (e.g., as opposed to a connector housing where the slot 230 was entirely the width of the constant width portion 232). Thus, the slot 230 is shaped and configured to make insertion of the leaf spring into the connector housing easier and quicker.

The leaf spring 200 as disclosed herein has other advantages. Staking as described above can compromise sealing requirements of a connector, as the staking process may weaken a connector and/or thin out a wall of the connector where the staking is performed. In addition, staking may require that a connector with multiple contacts be positioned laterally and orientated the same direction to properly stake the connector housing. The removal of staking from the process provides for contacts in a housing to be oriented in different ways since the staking does not constrain how the contacts are oriented.

In another advantage, the leaf springs include a jog (e.g., the jog 210 of leaf spring 200) that is set apart from or spaced away from the middle section of the leaf spring that secures the leaf spring within a connector housing. By spacing the jog feature far enough away from the other sections of the leaf spring, the entire rear section of the leaf spring may deflect during insertion into the insulator housing. This may reduce the stress on the jog feature during insertion. The reduced stress at insertion allows for stiff geometry and materials to be used for the jog feature itself to increase the spring retention force of the leaf spring. In other words, the jog feature may be kept stiff while allowing for the rear section as a whole to deflect based on interaction of the jog feature with the positive stop feature during insertion of the leaf spring.

The jog feature may also be placed generally in the middle of the rear section of the leaf spring. In this way, any forces acting on the leaf spring that cause the leaf spring to press against the positive stop will be generally evenly distributed to the leaf spring, rather than allowing the leaf spring to torque or otherwise have uneven forces applied to it from the positive stop.

Other configurations of connector housings and leaf springs than those shown in FIGS. 2-16 may also be used to achieve a self-retaining spring for a flat wiping contact. FIGS. 17-20 show various examples of other leaf springs that may be used in various embodiments of the present disclosure.

Figure 17:
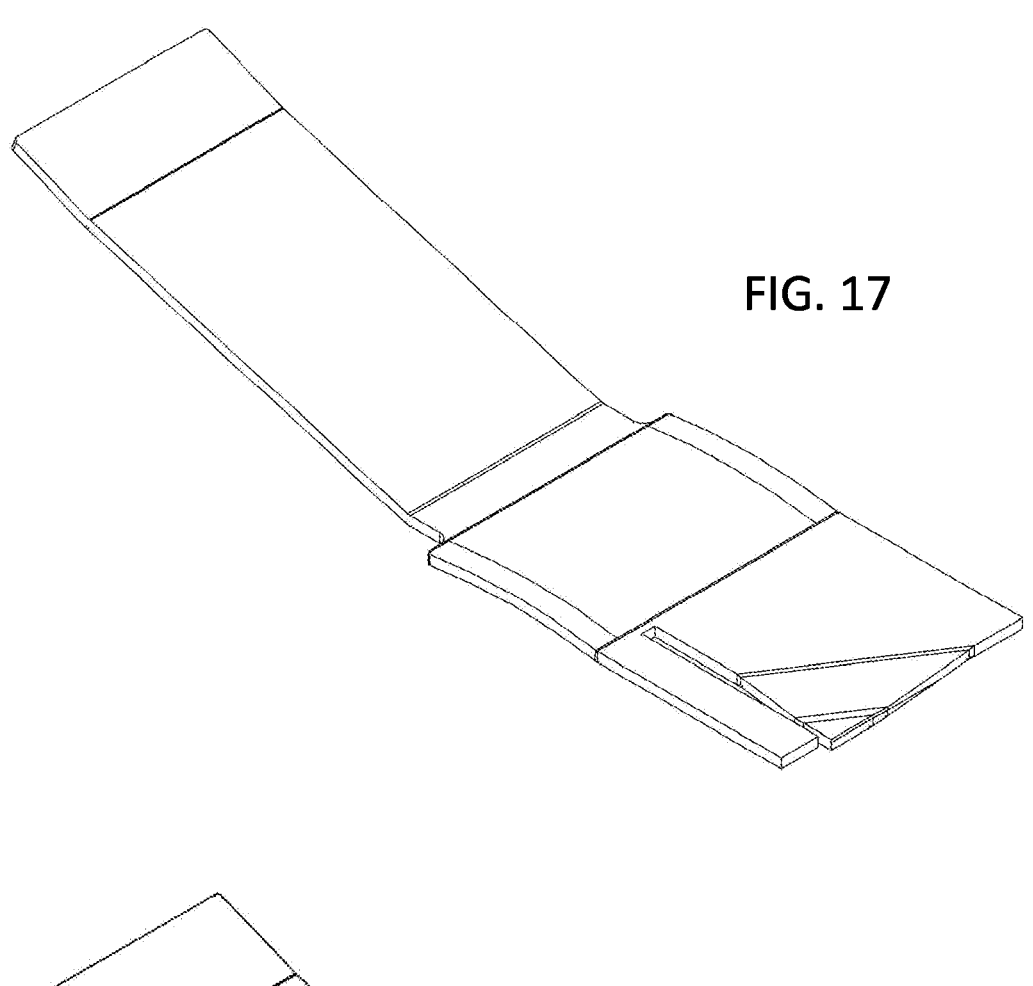
FIG. 17 is a top-right perspective view of a first alternative leaf spring in accordance with the teachings of the present disclosure.

FIG. 17 is a top-right perspective view of a first alternative leaf spring. The leaf spring of FIG. 17 is similar to the leaf spring 200 of FIG. 2, except the bends that form the jog feature have smaller radii than the bends 226 and 228. In addition, other smaller or larger radii may be used than those shown in FIGS. 2 and 17. In addition, a leaf spring that does not have rounded bends may be formed that still has a jog feature or similar to lock into a connector housing as disclosed herein.

Figure 18:
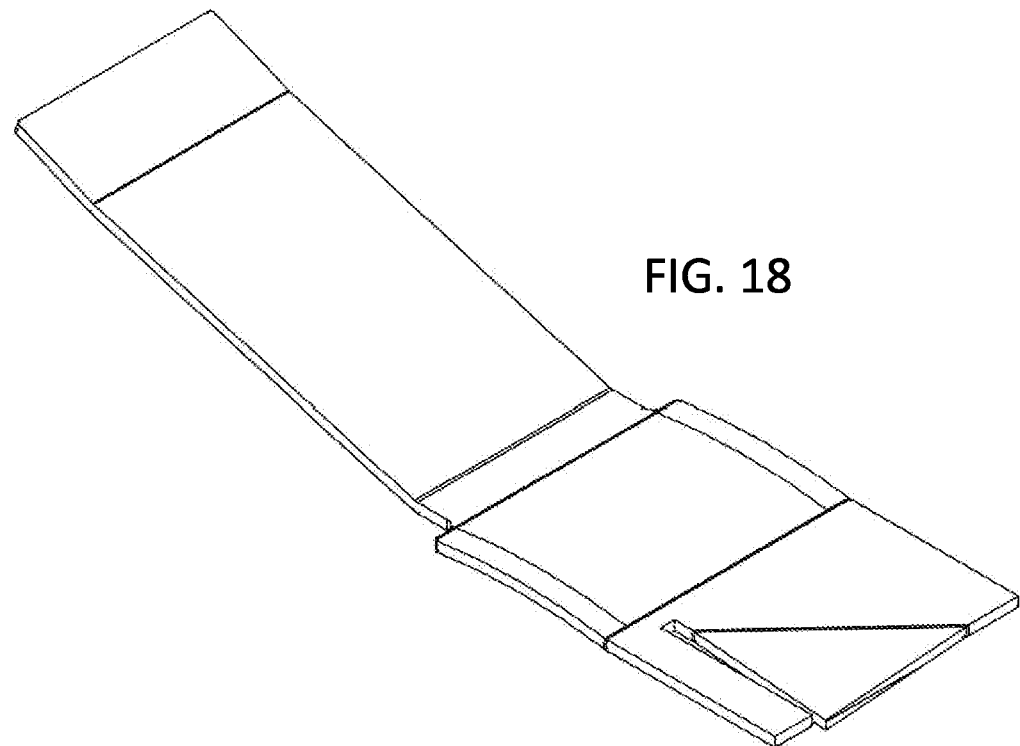
FIG. 18 is a top-right perspective view of a second alternative leaf spring in accordance with the teachings of the present disclosure.

FIG. 18 is a top-right perspective view of a second alternative leaf spring. The leaf spring of FIG. 18 only has a single bend in the rear portion to form the jog feature.

Figures 19, 20:
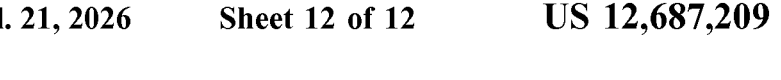
FIG. 19 is a top-right perspective view of a third alternative leaf spring in accordance with the teachings of the present disclosure.
FIG. 20 is a top-right perspective view of a fourth alternative leaf spring in accordance with the teachings of the present disclosure.

FIG. 19 is a top-right perspective view of a third alternative leaf spring. The leaf spring of FIG. 19 may be wholly bent downward to act similarly to a jog feature as disclosed herein. The rear section of the leaf spring in FIG. 19 does not have edges that fit within slots of a connector housing, but still has a middle section with extensions that fit into slots of a connector housing as disclosed herein.

FIG. 20 is a top-right perspective view of a fourth alternative leaf spring. Rather than a rear section, the leaf spring of FIG. 20 is configured with two wing portions. The wing portions maybe bent outward, for example, so that they interact with positive stops that may be formed in the sides of a connector housing. Once the leaf spring of FIG. 20 is fully inserted, the wings may move past positive stops so that they interfere with the positive stops to prevent the leaf spring from moving back out of the connector housing.

Accordingly, as is evident from the different configurations of leaf springs disclosed herein, many various types, shapes, and configurations of leaf springs may be used to form a self-retaining leaf spring that automatically locks into a connector housing upon insertion. Such leaf springs may be made out of any type of material, such as plastic, metal (e.g., stainless steel), or any other material suitable for the desired specifications of a flat-wiping connector. The connector housings may be made from an insulating material, such as plastic, rubber, or any other insulating material as desired.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A leaf spring for a flat-wiping connector comprising:
a front section having a first surface corresponding to a first plane, the front section further comprising a front edge configured to connect the leaf spring to the flat-wiping connector;
a rear section coupled to the front section; and
a longitudinal axis extending through each of the front section and the rear section,
the rear section comprising:
a second surface defining a second plane;
a third surface defining a third plane angled with respect to the second plane, the third surface coupled to the second surface about a bend oriented non-perpendicular to the longitudinal axis; and
a fourth surface defining a fourth plane and connected to the third surface, the fourth plane oriented at an angle with respect to the third surface and the third surface being between the fourth surface and the second surface,
wherein at least a portion of an edge of the rear section is configured to interact with a positive stop of a connector housing to lock the leaf spring within the connector housing upon insertion of the leaf spring into the connector housing,
wherein the fourth surface is generally parallel to the second surface and is angled with respect to the third surface, and
wherein the edge of the rear section configured to interact with the positive stop of the connector housing is located at least in part along the fourth surface.

2. The leaf spring of claim 1, further comprising a middle section between the front section and the rear section, wherein:
the front section is a first width, and
the middle section and the rear section are each a second width.

3. The leaf spring of claim 2, wherein the middle section comprises opposing edges configured to slide into respective slots of the connector housing.

4. The leaf spring of claim 1, wherein the rear section further comprises an opening extending from the edge of the fourth surface toward the front section.

5. The leaf spring of claim 4, wherein the rear section further comprises opposing edges configured to slide into respective slots of the connector housing, wherein the opening is located between the opposing edges.

6. The leaf spring of claim 1, wherein the leaf spring comprises a metal.

* * * * *